July 11, 1933.     S. E. HITT     1,917,446
THREE-HULLED AEROSHIP
Filed Nov. 21, 1932     10 Sheets-Sheet 1

WITNESSES:
Earle E. Weller
George H. Weller

INVENTOR
Samuel E. Hitt

July 11, 1933.  S. E. HITT  1,917,446
THREE-HULLED AEROSHIP
Filed Nov. 21, 1932  10 Sheets-Sheet 5

WITNESSES:
Earle E. Weller
George H. Weller

INVENTOR
Samuel E. Hitt

July 11, 1933.　　　　S. E. HITT　　　　1,917,446
THREE-HULLED AEROSHIP
Filed Nov. 21, 1932　　　10 Sheets-Sheet 7

WITNESSES:
Earle E. Weller
George H. Weller

INVENTOR
Samuel E. Hitt

July 11, 1933. S. E. HITT 1,917,446
THREE-HULLED AEROSHIP
Filed Nov. 21, 1932 10 Sheets-Sheet 8

WITNESSES:
Earle E. Weller
George H. Weller

INVENTOR
Samuel E. Hitt

Patented July 11, 1933

1,917,446

UNITED STATES PATENT OFFICE

SAMUEL E. HITT, OF ELYRIA, OHIO

THREE-HULLED AEROSHIP

Application filed November 21, 1932. Serial No. 643,629.

This invention relates to an aero-plane-ship, hereinafter called an aeroship, a three hulled seagoing vessel carrying air propulsion units and a lifting plane and which at high speeds glides lightly upon the surface of the water or skids through the crests of waves.

My aeroship is a ship in the sense that it is not intended to leave the water and similar to a hydroplane in that the aerofoil lifts one or all of the hulls partly out of the water to reduce the head resistance due to the water. This head resistance is further reduced by the three hulls having a small cross section and narrow width or small beam in proportion to their length.

My aeroship is now planned to carry two thousand (2,000) passengers and one hundred (100) crew at a speed of eighty (80) miles an hour in good flying weather, crossing the Atlantic ocean in twenty five (25) hours.

An object of my invention is to provide a main cabin large enough for a ball room and banquet hall for a thousand guests, that tourists may enjoy all the comforts, pleasure and luxury of modern travel. My main cabin is now planned two hundred and sixty (260) feet in diameter, with a dance floor two hundred (200) feet in diameter and foyer thirty (30) feet wide.

An object of my invention is to provide an aeroship with only one large lifting aerofoil to avoid the drag effect of a tandem aeroplane.

An object of my invention is to provide all propulsion units with four blade propellers to reduce the speed of revolution and therefore the noise, to further contribute to the comfort of passengers.

An object of my invention is to provide tractor propellers at the leading edge of lifting plane below the lifting surface and pusher propellers at the trailing edge of plane above the lifting surface to balance the truss load and reduce the power effort required to rotate the aerofoil truss for adjustment of plane inclination.

My aeroship is equipped with seventy-two propulsion motors of seven hundred and fifty horse power each and four propulsion and steering turret units of twenty-five hundred horse power each, making sixty-four thousand horse power with sixteen hundred horse power additional for pneumatic and electrical operations.

An object of my invention is to provide the lifting propeller units with individual electric motors for starting.

An object of my invention is to stabilize my hulls against pitching. This is accomplished by the great length of the aeroship.

The outer hulls are spaced from the center hull by cross spanners and are kept abreast the center hull by link connections to the cross bridge. All three of my hulls therefore, are free to pitch forward and aft independently of each other. To reduce this pitching of the hulls to a minimum, my center hull is about eleven hundred and forty feet long, with a water line nine hundred feet long. My outer hulls are considerably shorter, about nine hundred and sixty feet long. On account of the outer hulls being shorter than the center hull, the aeroship responds better to the helm and can turn on a shorter radius.

An object of my invention is to stabilize the hulls against rolling. To accomplish this purpose, my center hull carries a cross bridge built integral with the large circular cabin and which also acts as a support for the aerofoil truss.

An object of my invention is to stabilize this center hull against rolling by air cylinder connections between the cross bridge and the outer hulls.

An object of my invention is to stabilize the outer hulls against rolling by air cylinder connections between the outer hulls and the cross spanners. In other words, the center hull stabilizes against the outer hulls and the outer hulls stabilize against the cross spanners. The cylinders stabilize irrespective of the pitching of the hulls and are controlled by a device I call my automatic pneumatic electric two stage step up pressure regulator with mercurial U-tube contactor, and which will be the subject of a separate application.

My wing spread is six hundred feet and being often exposed to the sun and shading its supporting bridge underneath there is considerable difference in the expansion and contraction of the aerofoil truss and its supporting bridge.

An object of my invention is to provide for this condition by slip mountings between the aerofoil truss and the intermediate and end housings.

An object of my invention is to provide motor drives at each of the housing mountings of the aerofoil truss for regulation of inclination of aerofoil.

An object of my invention is to synchronize these drives so that the aerofoil truss shall not twist when subjected to torsional strain due to puffy winds.

An object of my invention is to provide a floating worm drive for rotation of the aerofoil truss for adjustment of inclination. The aerofoil truss is mounted in the housings with frictionless ball or roller bearings and bearing adjustments can then be made without realignment of the worm and worm gear.

An object of my invention is to connect the cross spanners to the outer hulls below the water line to help stabilize the outer hulls against rolling.

An object of my invention is to connect the center hull stabilizing piston rods to the outer hulls below the water line for the same purpose, i. e., to help stabilize the outer hulls against rolling.

An object of my invention is to provide water closure at deck level for the outer hull pits required for the center hull stabilizing piston rod and for the vertical spanner legs.

An object of my invention is to provide the three hulls with sponsons running the entire length of hull to increase the beam or width of hull to prevent the hull from buckling sideways.

An object of my invention is to provide my hulls with gondola bows, so that my aeroship can ride the highest waves liable to be encountered in northern waters.

An object of my invention is to provide the bows of the three hulls with propeller turrets for propulsion and steering. For turret, see patent to me, Propeller turret for propulsion and steering of aeroships, Dec. 29, 1931, No. 1,838,258.

An object of my invention is to provide the center hull with an aft propulsion and steering turret so that the two turrets on center hull can be turned to an angle to windward to balance drift and hold the aeroship to its course.

An object of my invention is to provide a two plane connection of spanner to center hull, i. e., allowing for motion in two directions, but holding the spanner upright.

An object of my invention is to provide a universal step bearing between spanner and outer hull.

An object of my invention is to provide the spanners with lifting planes large enough to carry their own weight.

An object of my invention is to provide the links between cross bridge and outer hulls with universal joints and frictionless bearings.

An object of my invention is to provide all stabilizing cylinders with universal mountings.

An object of my invention is to provide all stabilizing piston rod connections with universal joints.

An object of my invention is to provide safety cables to safeguard my aeroship against serious mishap in case one or both of the links should fail.

An object of my invention is to provide separate power plants in each of the hulls to distribute the load and to locate all machinery on medial plane of hull as an aid to stabilization. The power plant includes electrical generator for power and light, air compressors, gas and heating units, oil and water pumps, steam boiler, water evaporator, etc.

An object of my invention is to provide separate air compressors for stabilizing cylinders for center hull and for those forward and aft on outer hulls, five in all to balance the loading.

An object of my invention is to provide an elevator at center of main cabin from the hold to the elevated walk above the dance floor to the captain's cabin. The elevator framework also acts as a center post to support the cabin roof and cross bridge.

An object of my invention is to provide air and water tight inclosures accessible from below for search light and for forward and aft port and starboard lights on the outer hulls.

An object of my invention is to provide a covered opening in the aft deck of the center hull near the stern, an elevator to lower deck and floor room for a limited number of automobiles. Removable runway from the opening over the stern provides for loading the automobiles directly from the wharf.

When my aeroship is up to speed and the forward part lifts, the hulls incline some and it might be difficult for young people to become accustomed to dancing on ship. It is an object of my invention to build the main cabin and dance floor inclined forward so that the floor will be approximately level when my aeroship is up to speed.

An object of my invention is to provide safety float chambers, air and water tight, under the entire floor of the main circular cabin, except for the openings for elevator and stairway.

My invention stabilizes the center hull and the large lifting aerofoil by pneumatic cylinders carried by the cross bridge and exert a downward pressure part of the time on one or the other of the outer hulls. In order to produce a lifting effect upon the outer hulls when the aerofoil lifts the forward part of the center hull, a further object of my invention is to provide cable connections between the cross bridge and the outer hulls, one end of the cable fastened to the bridge, the other end of the cable arranged with sheaves and air cylinder on outer hull deck and take up slack and maintain a constant tension in the cable and which will be the subject of a separate application.

When lying at anchor in perfectly calm water, the three hulls are parallel. When an outer hull pitches with regard to the center hull, their medial vertical planes are no longer exactly parallel owing to the small horizontal component motion of outer hull at spanner due to the up or down swing of the spanner. The outer hull is drawn in some when the spanner swings up and when it swings down.

In like manner, the swing of the links connecting the cross bridge and the outer hulls give the outer hull a relative small forward motion when the link swings up or down.

As the outer hulls seldom or never rise or fall with an even keel so as to be parallel to the center hull and can safely be said to always pitch, the relative motion between center hull and outer hull can best be called a near parallel motion.

These obstacles have been overcome in my invention by providing universal joints for all connections between hulls.

My aeroship having a carrying capacity of 2100 passengers and crew, being practically nonsinkable and too heavy to be upset by any hurricane ever encountered in northern waters and with a cruising speed of eighty miles an hour, a great advance is made in oceanic passenger transportation.

With the above and other objects in view, the invention further includes the following novel features and details of construction, to be hereinafter more fully described, illustrated in the accompanying drawings and pointed out in the appended claims.

Referring to the drawings:—

Figure 1:
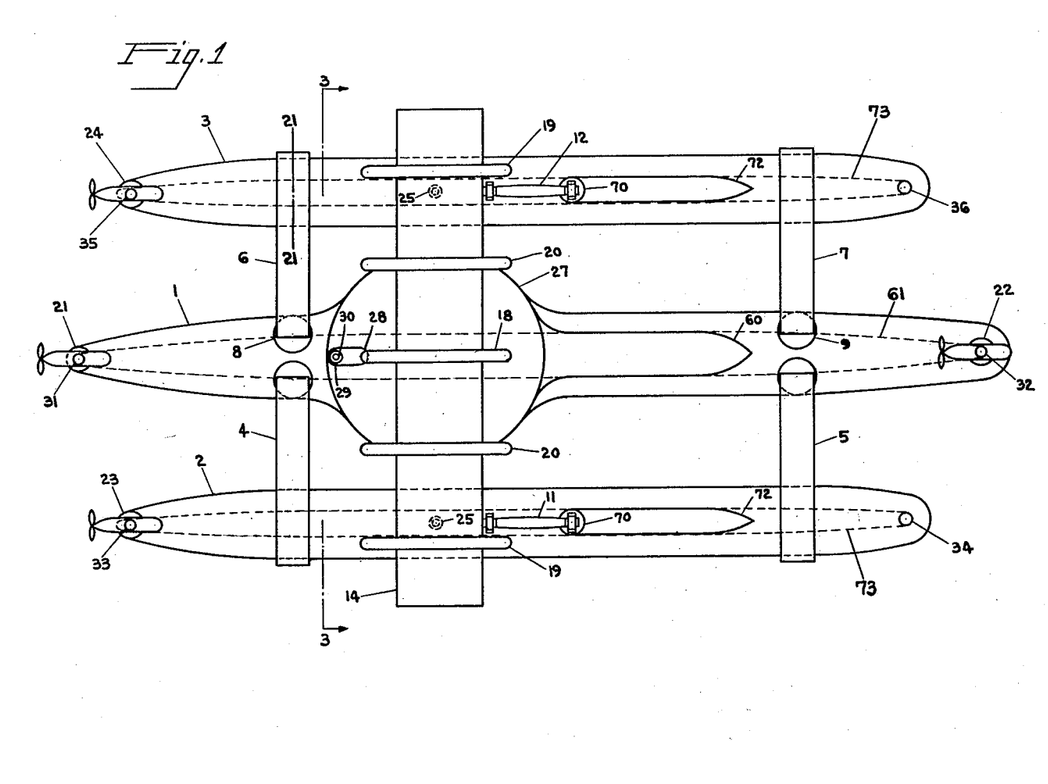
Fig. 1 is a plan of my aeroship.
Figure 2:
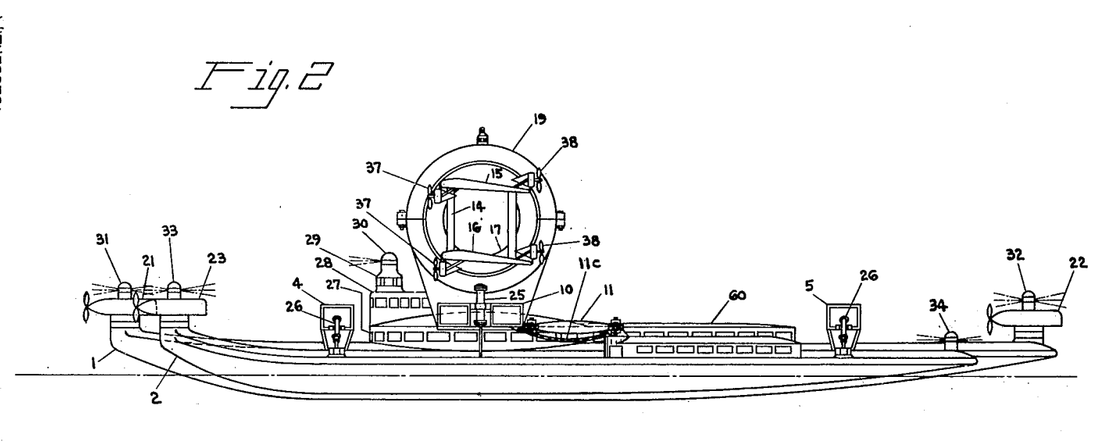
Fig. 2 is a side view of my aeroship.
Figure 3:
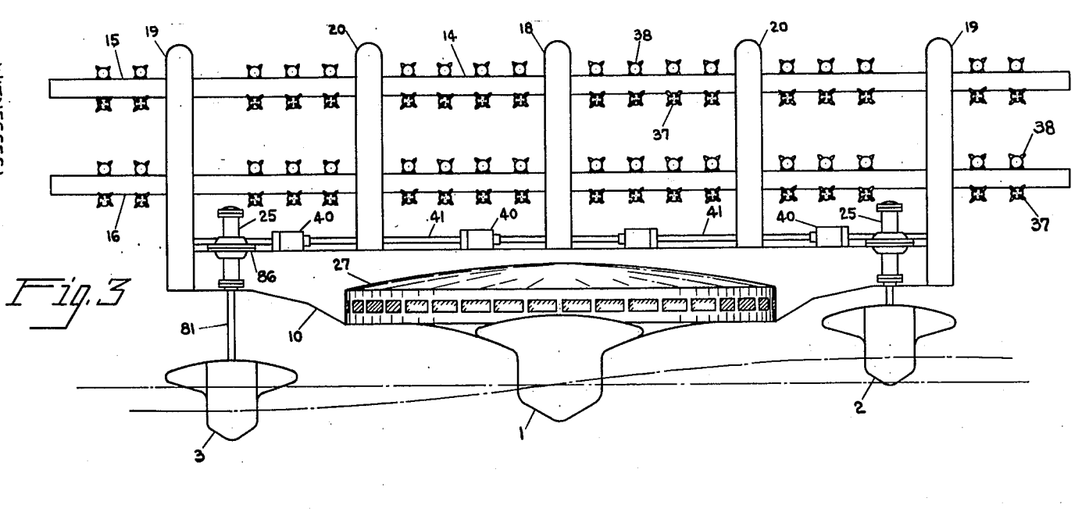
Fig. 3 is a sectional elevation on line 3—3 of Fig. 1.

*Numerals.*—In Figs. 1, 2 and 3, 1 is the center hull, 2 the port hull, 3 the starboard hull, 4 the forward port spanner, 5 the aft port spanner, 6 the forward starboard spanner, 7 the aft starboard spanner, 8 the forward turntable, 9 the aft turntable, 10 the cross bridge, 11 the port link, 12 the starboard link, 14 the aerofoil truss, 15 the upper lifting plane, 16 the lower lifting plane, 17 the truss rings, 18 the center ring housing, 19 the outer ring housing, 20 the intermediate ring housing, 21 the forward center hull turret, 22 the aft center hull turret, 23 the forward port hull turret, 24 the forward starboard turret, 25 the center hull stabilizing cylinder, 26 the outer hull stabilizing cylinder, 27 the main cabin, 28 captain's cabin, 29 pilot house.

Enclosures for lights are 30 search light, 31 forward center hull light, 32 aft center hull light, 33 forward port red light, 34 aft port red light, 35 forward starboard green light, 36 aft starboard green light.

My propulsion unit consists of a combustion engine driving a four blade propeller and equipped with an electric starter.

In Figs. 2 and 3, the forward propulsion units 37 are tractors mounted below the lifting surfaces, the aft propulsion units 38 are pushers mounted above the lifting surfaces in a manner to balance the aerofoil truss load rotatively.

Figure 4:
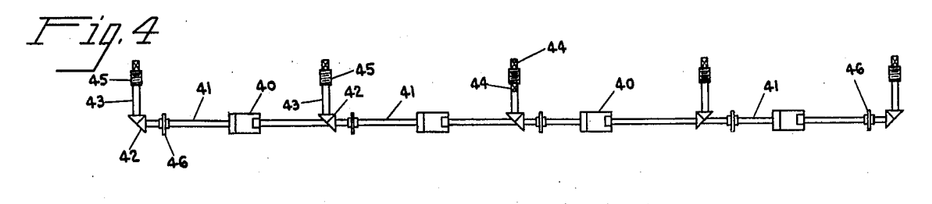
Fig. 4 is a diagram of the inclination drive.
Figure 13:
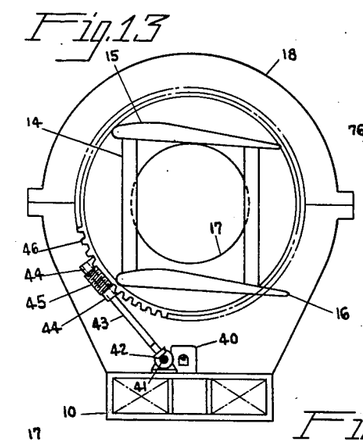
Fig. 13 is an end view of aerofoil truss and inclination drive.

In Figs. 3, 4 and 13, the aerofoil truss 14 is revolved by the electric motors 40, shafting 41, miter gears 42, shafting 43, bearings 44, worms 45, and worm gear 46, on truss ring 17. The truss ring 17 is built into the truss 14 which carries the lifting planes 15 and 16.

The four electric motors 40 are all connected together by sectional shafting 41 to distribute the load and synchronize the power effort. Shafting 41 is provided with couplings 46 for purposes of construction and repairs.

Figure 14:
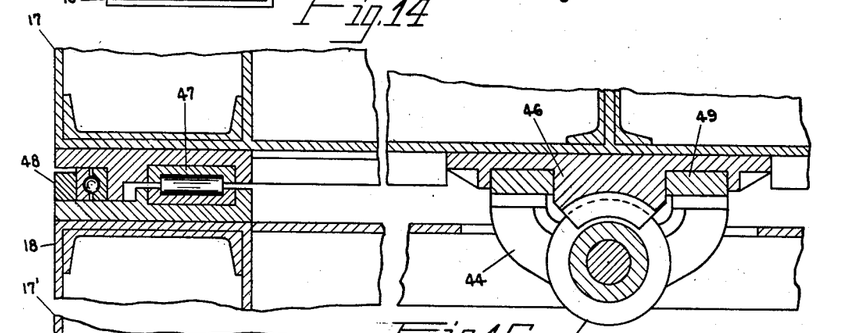
Fig. 14 is a section of worm drive at center housing.

In Fig. 14, truss ring 17 is mounted in central housing 18 with roller bearings 47 and thrust bearings 48. Worm bearings 44 are carried by rings 49 on each side of the worm gear 46.

Figure 15:
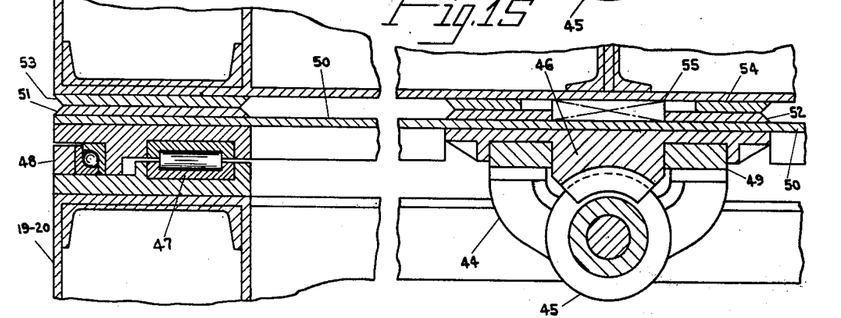
Fig. 15 is a section of worm drive at intermediate and outer housings.

In Fig. 15, for the intermediate and outer housings 20 and 19, the drive is similar, except for the addition of the expansion joint. The worm gear 46 is mounted on the shell 50 which carries the wearing plates 51 and 52 fitting the wearing plates 53 and 54 mounted on the truss ring 17'. Power is transmitted from the worm 46 and shell 50 to the truss ring 17' through the feather key 55.

Figure 5:
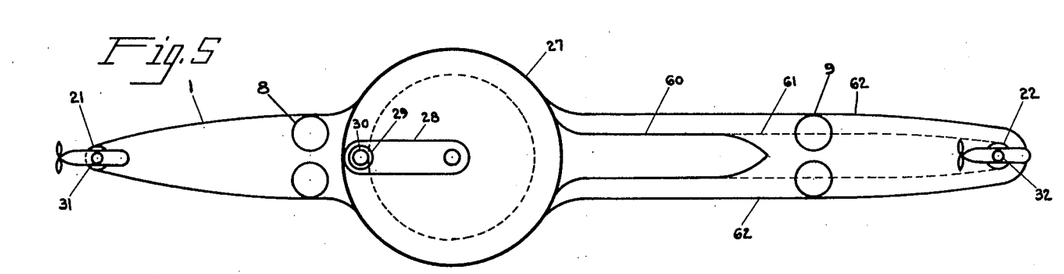
Fig. 5 is a plan of the center hull with the cross bridge removed.

Fig. 5 is a plan of the central hull with bridge removed. The main cabin 27 is located forward of the center of gravity, about one-third the hull length aft of the bow.

The deck cabin 60 extends aft from the main cabin 27 and has the same width as the hull proper 61 as shown in Fig. 1.

The sponsons 62, shown in Figs. 1, 3, 5, 16 and 17, are full length of hull from bow to stern and around the stern, having numerous partitions to form a honeycomb construction of sealed air and water tight compartments. The purpose of the sponsons is three fold, namely, to increase the width or beam of the narrow hull proper 61, to act as safety floats to render the hull 1 practically nonsinkable and also on account of the wash, when the hull rises forward or when it pitches and the narrow skid portion or hull proper 61 dips heavily into the sea, the sponsons 62 ride upon the waves and prevent complete immersion of any part of the hull 1.

Figure 16:
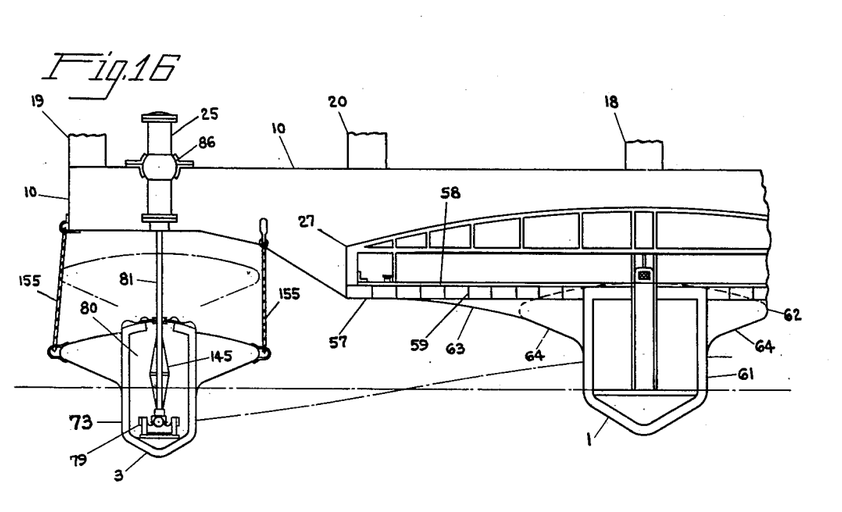
Fig. 16 is a part section of aeroship, main cabin and bridge.

In Fig. 16 the main cabin 27 is elevated above the hull proper 61 sufficiently to allow the bottom to be closed with the curved surfaces 63 which shape into the lower surfaces 64 of the sponsons 62.

The bottom 57 of the circular cabin 27 is built deep and braced to carry the overhang. The space between the floor 58 and the bottom 57 is divided by partitions 59 into air and water tight chambers which act as safety floats, in case of mishap to prevent the areoship from turning turtle.

Figure 6:
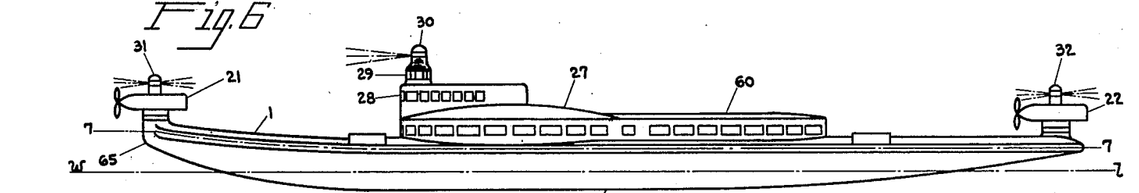
Fig. 6 is a side view of the same.

In Fig. 6, the hull 1 is shown to have a gondola bow with a rise of the keel line at the bow point 65 of forty feet above mean water level w—l.

Figure 7:
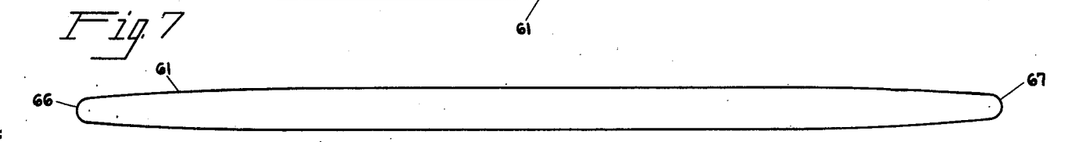
Fig. 7 is a sectional plan of center hull on line 7—7 of Fig. 6.

Fig. 7 is a section of hull proper 61 on center line of sponsons 7—7 of Fig. 6, sponsons removed. The bow 66 and the stern 67 are nosed to suit the base diameter of turrets 21 and 22.

Figure 8:
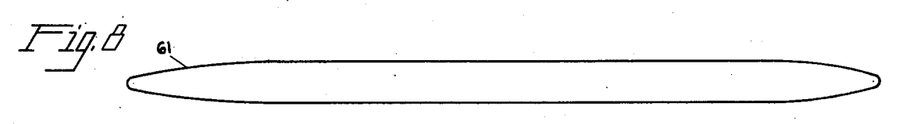
Fig. 8 is a sectional plan of center hull on water line w—l of Fig. 6.
Figure 9:
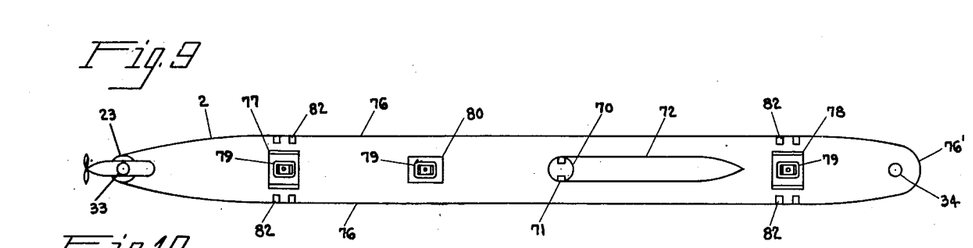
Fig. 9 is a plan of the outer hull.
Figure 10:
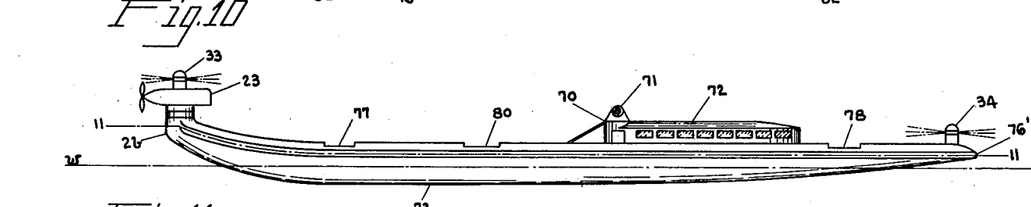
Fig. 10 is a side view of the same.
Figure 11:
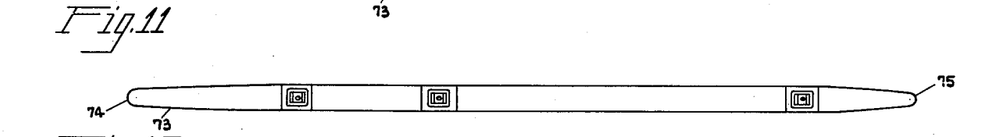
Fig. 11 is a sectional plan of outer hull on line 11—11 of Fig. 10.

Fig. 8 is a section of hull proper 61 on water line w—l of Fig. 6. The ratio of hull width to length at water line is about 1 to 18. The ratio of beam or overall width to length of hull is about 1 to 11.4.

The outer hulls 2 and 3 are identical. In Figs. 9, 10, 11 and 12, one of the outer hulls 2 is shown in more detail. The outer hull 2 gets its forward and aft motion from the cross bridge 10, link 11 and connection to the tower 70 at pivot bearings 71.

The deck cabin 72 extends aft from the tower 70. The deck cabin 72 has the same width as the hull proper 73. The hull proper 73 is nosed at the bow 74 to suit the turret 23 and nosed at the stern 75 to suit the light enclosure 34. The sponsons 76 on both sides of hull extend from bow to stern and around the stern at 76'.

The forward pit 77 and the aft pit 78 are for the step bearings 79 for the spanners 4 and 5.

Figure 27:
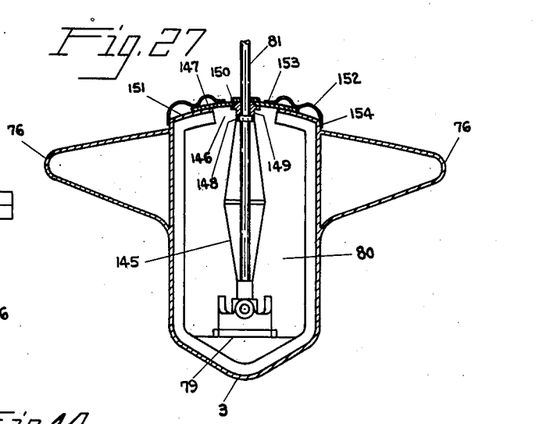
Fig. 27 is a section of outer hull at center line of bridge.
Figure 28:
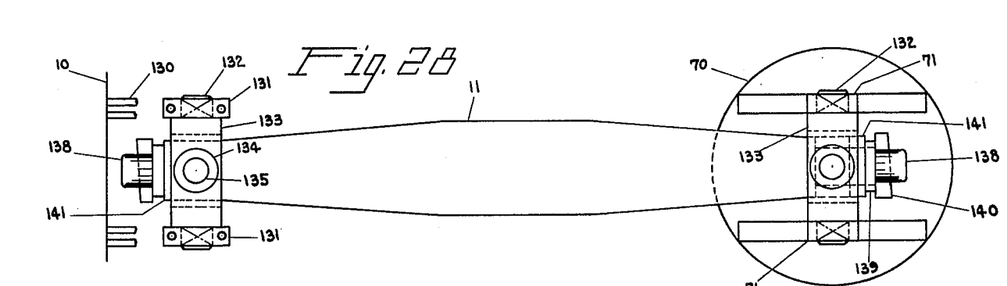
Fig. 28 is a plan of the hull link.
Figure 29:
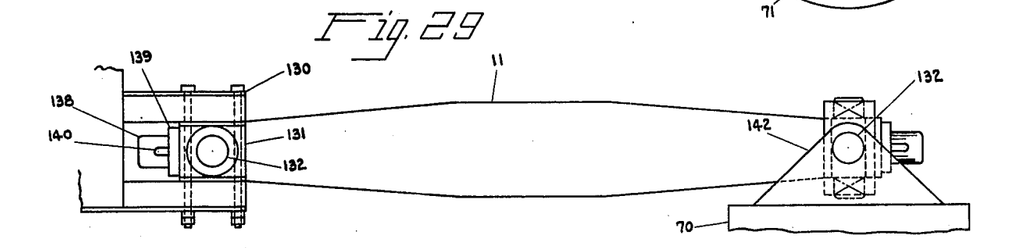
Fig. 29 is a side view of the same.
Figure 30:
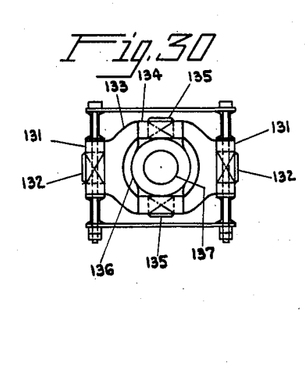
Fig. 30 is an end view of the same at bridge end.
Figure 31:
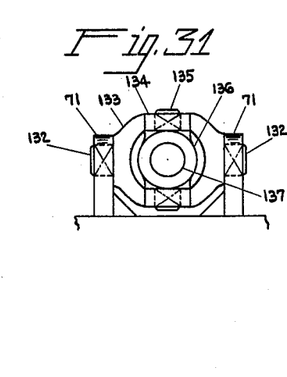
Fig. 31 is an end view of the same at hull end.
Figure 32:
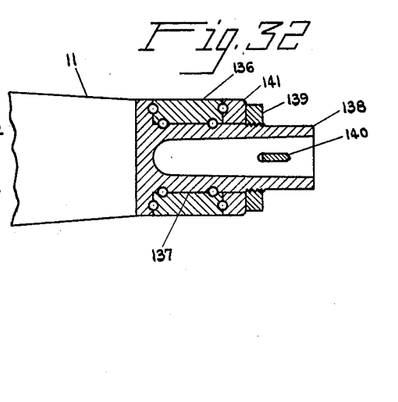
Fig. 32 is a section of link stud shaft.

The pit 80 is for the step bearing 79 for connection of the stabilizing connecting rod 81 for the cylinder 25 shown in Figs. 16 and 27.

Figure 17:
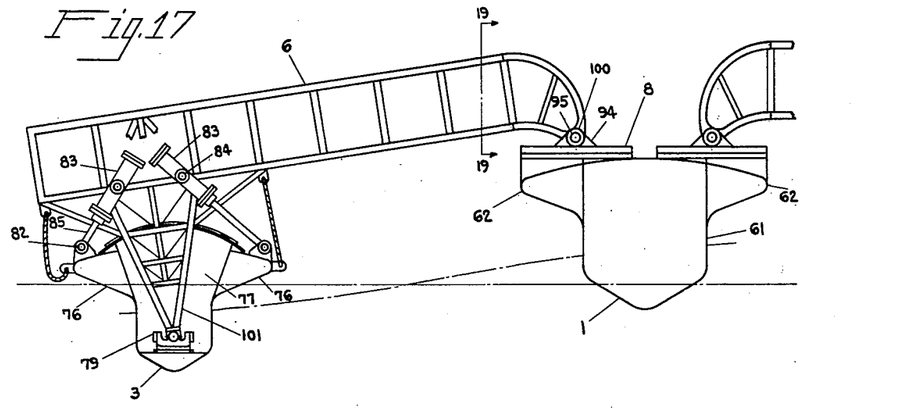
Fig. 17 is a part section of aeroship at spanner.
Figure 18:
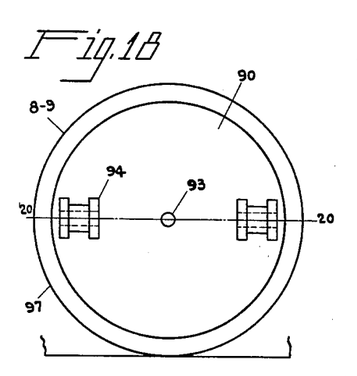
Fig. 18 is a plan of spanner turntable.

Bearings 82 are for connection of connecting rod 85 of the stabilizing cylinders 83 shown in Fig. 17.

Figure 12:
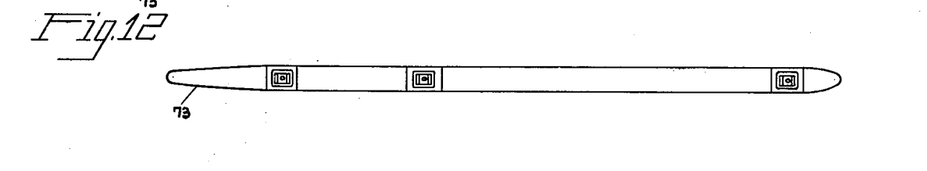
Fig. 12 is a sectional plan of outer hull on water line w—l of Fig. 10.

In Fig. 12, at water line, ratio of hull width to length is about 1 to 27. The ratio of beam or overall width to length of hull is about 1 to 12.

The keel line at the bow 2b, has an elevation of forty feet above mean water level w—l, same as for center hull.

All three of my hulls, 1, 2 and 3, are constructed entirely of aluminum alloy, having the strength of steel and only about one third as heavy, to enclose the largest space for the allowable weight.

For spanners 4, 5, 6 and 7 see Figs. 1, 2, 17, 18, 19, 20, 21 and 22. Inner ends of spanners are connected to center hull at turntables 8 and 9, sectioned in Fig. 20, in which turntable 90 is mounted on base 91 with ball bearings 92 and centered by king pin 93. Spanner 6 is mounted on turntable 90 with bearings 94 and pin 95. Any lifting action of spanner 6 is taken up by ball bearing 96 between table 90 and cover ring 97 carried by the brackets 98.

Figure 20:
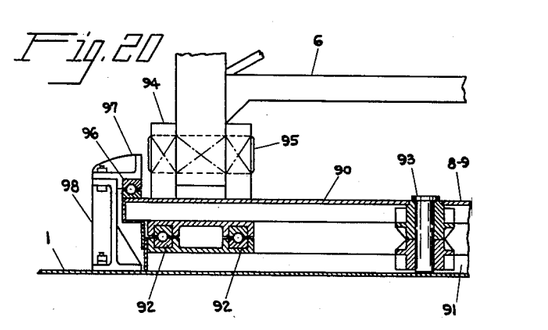
Fig. 20 is a part section on line 20—20 of Fig. 18.
Figures 23, 26:
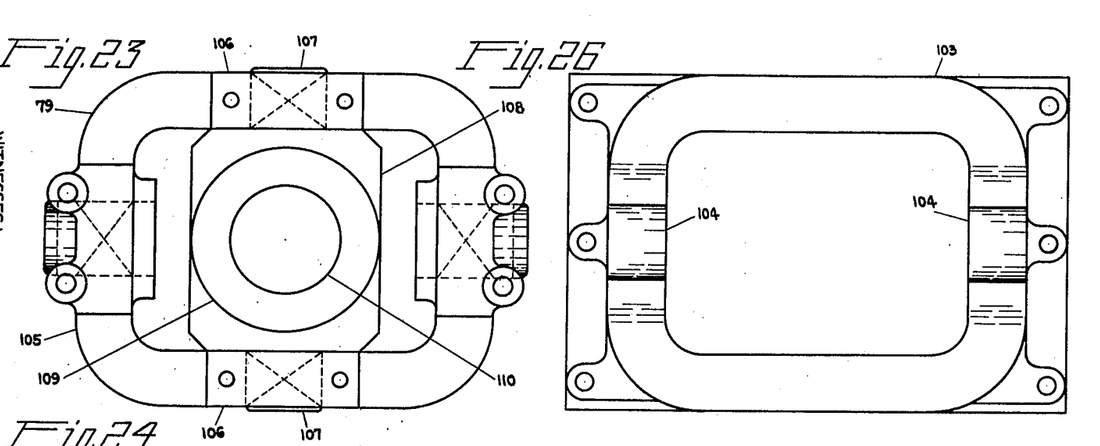
Fig. 23 is a plan of the universal step bearing.
Fig. 26 is a plan of the base of the same.
Figure 24:
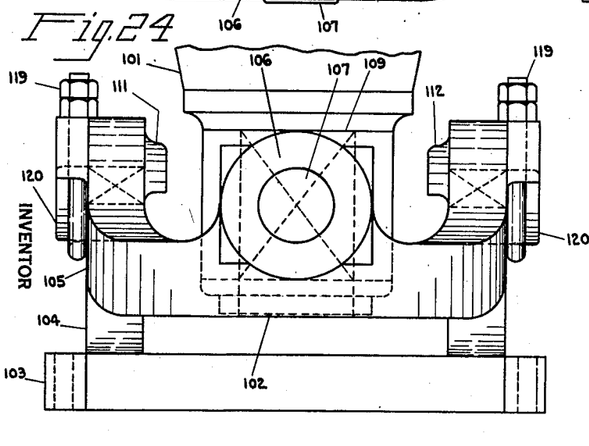
Fig. 24 is a side view of the same.
Figure 25:
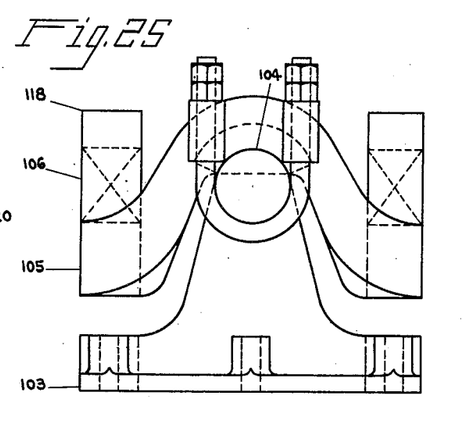
Fig. 25 is an end view of the same.

The turntable connection of spanner 6 to hull 1 allows horizontal and vertical swinging motions of spanner but prevents rotary motion so that the medial plane of spanner is always at right angles to the horizontal plane or deck plane of hull 1, or, in other words, the medial plane of spanner is approximately vertical but pitches some with hull 1.

In Fig. 17, spanner 6 connects to turntable 8 on hull 1, through hub 100, pin 95 and bearing 94. Spanner 6 connects to hull 3 through its vertical leg 101, vertical stud shaft 102 shown in Fig. 22, and step bearing 79 carried by hull 3 below the water line.

In Figs. 23, 24, 25 and 26, the universal step bearing 79 consists of a base 103 supporting half bearings 104 upon which rocks the cradle 105 having bearings 106 for the trunnion shafts 107 of the block 108 which carries the supporting bearing 109 for the spanner leg 101 and the ball bearing 110 for the vertical stud shaft 102.

The leg 101 is thus supported but able to rock forward and back or sideways or to turn horizontally or any combination of these motions.

Wave action has a tendency at times to separate hulls 1 and 2 or 1 and 3 and at times to bring them closer together. This strain is transmitted through the spanner 6, leg 101, stud shaft 102, block 108, cradle 105, lug 111 or lug 112 to one of the half bearing stands 104 and thus to the base 103 secured to the hull 3.

The spanner 6 carries a plane 114 large enough to lift the spanner when aeroship is up to speed, and should the spanner leg 101 ever have a tendency to lift the stud shaft 102 out of its bearing 110 in block 108, the leg 101 is held to the block 108 by the nut 115 and collar 116 with ball bearing 177, the block 108 is held to the cradle 105 by the caps 118 and the cradle 105 is held to the base 103 by the U-bolts 119 engaging stud shafts 120 on the base 103, concentric with the half bearing 104 and to which the U-bolts 119 are loosely fitted.

As the plane 114 must first lift the weight of spanner, this upward force is comparatively small.

Figures 19, 21, 22:
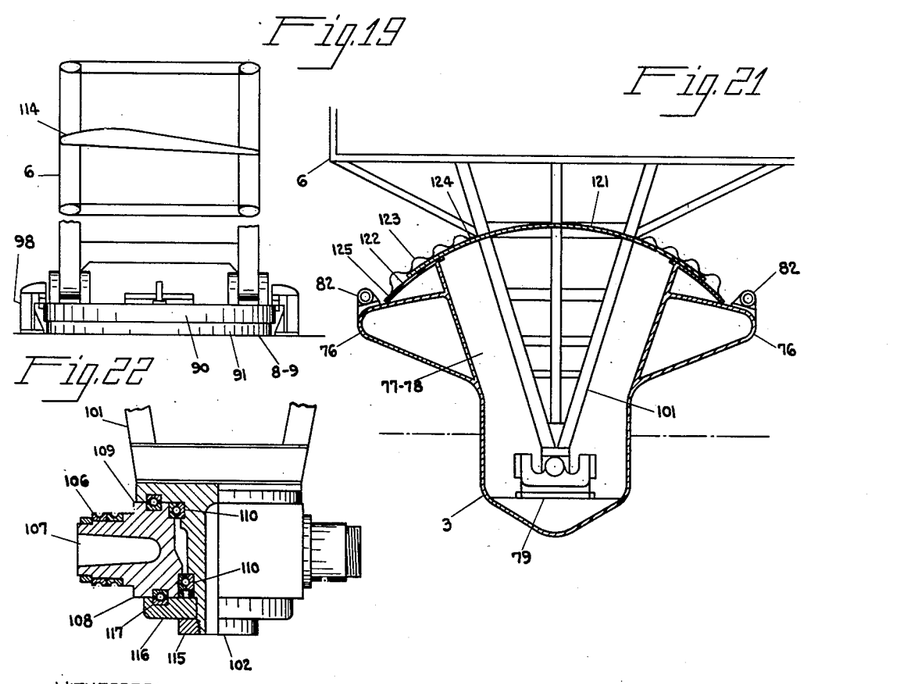
Fig. 19 is a section on line 19—19 of Fig. 17.
Fig. 21 is a section on line 21—21 of Fig. 1.
Fig. 22 is a part section of vertical stud shaft of spanner.

In Fig. 21, the spanner pits 77 and 78 in the hulls 2 and 3, are closed at deck level by a spherical shell 121 built into the spanner leg 101, having a sliding fit over the spherical shell 122 built on top of deck around the opening of pit 77. Water closure of the pit 77 is further secured by the elastic rubber cover 123 secured to the shell 121 near the leg 101 at 124 and at the lower edge to the shell 122 near the deck at 125. The pit 77 is provided with a sump which is automatically drained by a float operating a suction pump in case water should accidentally get through the shell joint.

Link connection between the cross bridge 10 and the outer hulls 2 and 3 is shown in Figs. 28, 29, 30, 31 and 32, in which 11 is the link, 130 the brackets carried by the cross bridge 10 and on which are mounted the bearings 131 for the trunnion shafts 132 of the ring block 133 which carries bearings 134 for the trunnion shafts 135 of the center block 136 which carries the bearing 137 for the stud shaft 138 at forward end of link 11. The stud shaft 138 is held in the block by nut 139, key 140 and washer 141.

The universal joint at the aft end of link 11 is similar, the trunnions 132 being mounted in bearings 71 carried by brackets 142 on top of the tower 70 of the outer hull 2. The sliding surfaces of these universal joints are equipped with ball bearings.

In case either of the links 11 or 12 or their connections should fail, the hulls 2 and 3 are further connected to the cross bridge 10 by the safety cables 11c and 12c shown in Fig. 2.

In Figs. 3 and 16, the aerofoil truss 14 is carried by the housings 18, 19 and 20 mounted on the cross bridge 10 which is built in with the main cabin 27 built upon the center hull, the floor of the cabin at deck level.

The center hull 1 can therefore only roll as much as the aerofoil 14 and the bridge 10 tilt.

The center hull 1 and the main cabin 27 are stabilized against rolling by the air cylinders 25 mounted with universal bearings 86 on the cross bridge 10, at both ends, directly above, and on medial planes of outer hulls 2 and 3. The piston rod 81 extends down through the pit 80 and connects to the universal step bearing 79 in the hold of hull 3. Within the hull, the piston rod has reinforcement 145.

Pit 80 has an opening in the deck 146 to allow clearance for piston rod 81 for maximum roll of hull 3. The opening 146 is closed by the spherical shell 147 mounted on the piston rod 81 with collar 148, sleeve 149 and flange 150.

The shell 147 rests upon and has a sliding fit with the spherical dome 151 built on the deck concentric with central position of connecting rod 81.

The spherical radius of the sliding contact surfaces springs from the center of the universal step bearing.

Water closure is effected by the elastic rubber covering 152 secured at 153 to the shell 147 and at 154 to the dome 151.

The cylinder and piston rod are long enough to allow for a total rise and fall of the outer hulls 2 and 3, relatively to center hull 1, of about thirty feet.

In Fig. 16, safety cables 155 between the cross bridge 10 and the hull 3, limit the piston stroke.

In Fig. 17, the outer hull 2 or 3, is stabilized by air cylinders 83, with universal mounting 84 on spanner 6. Piston rod 85 connects to universal bearing 82 at the hull sides. The center line of cylinder 83 is at right angles to a line between bearing centers 82 and 79, at half the throw, i. e., the cylinders are set to split the angle.

*Operation*

My aeroship is built as light as possible, no woodwork being used, the metallic cabin walls painted for decorative effect. Wickerwork and metallic furniture, air mattresses and air cushions are used.

Proportional to power and lifting surface, my aeroship is from three to five times heavier than a seaplane as now generally built, so there is little danger of its being turned over or wrecked by the wind.

The navigator is in constant touch with the radio weather reports and at high speed is able to avoid a storm center. However, should a fog be encountered, and the visibility become such as to require a much reduced speed, the navigator can either turn about and go back or he can advise the pilot to revolve the aerofoil truss 14, 180 degrees, i. e., turn it up side down, and the aeroship runs backwards at somewhat reduced speed. This only becomes necessary when the sea is running high and the pilot thinks it inadvisable to turn the aeroship around on account of the severe test put upon the spanner connections when the hulls get into the trough of high waves.

Another alternative is to face the wind and waves, cast anchor and ride out the storm. Should the hawser part, all propulsion motors can be run at reduced speed to keep the aeroship from drifting. When the storm subsides and the visibility improves, the aeroship proceeds.

In good flying weather, with the aeroship up to speed, the stabilizing cylinders have little or nothing to do as the large aerofoil 14 has a large lift in proportion to any variation of wind pressure along its length.

The inertia of the aerofoil truss and cross bridge also has a steadying influence on any dipping tendency of the aerofoil.

When up to speed, and the forward portion of aeroship rises some in the water, the ship tilts up and throws the sterns down so that the hull sponsons aft wash heavily in the sea, and on account of their width, keep the outer hulls from rolling. The center hull has a beam of about a hundred feet and the outer hulls a beam of about eighty feet.

When at anchor or when running at reduced speed, the reaction of the sea against the hulls is greater and stabilization of hulls against rolling becomes necessary.

The stabilizing cylinders are served by compressed air tanks kept under constant pressure, and are controlled by an automatic device, as explained herebefore.

Air cushion cylinders are also provided to act as bumpers, so that in case the stabilizing cylinders go out of commission, no great harm or mishap will occur.

The steering turrets each have their attendants who receive orders from the pilot by electric gong, colored lights and by telephone.

The aerofoil propulsion motors and the aerofoil inclination motors are under the direct control of the pilot.

At reduced speeds, officers and crew can pass from one hull to another, but no closed passage of that kind is provided for passengers on account of the added air resistance.

My aeroship is equipped with a steam whistle, siren, fog horn, and powerful search light and a radio broadcasting station, every precaution being taken to avoid accident at sea.

My aeroship is also equipped with disappearing life boats which drop into pockets in the sponsons to reduce air resistance.

I claim:

1. In an aeroship or similar craft, a center hull, an outer hull on each side of the said center hull, spanners connecting the said outer hulls to the said center hull forward and aft, a cross bridge carried by the said center hull extending over the said outer hulls, links connecting the said outer hulls to the said cross bridge, side sponsons on the said center hull, a cabin built integral with the said center hull and the said cross bridge, the said cabin construction including cabin side portions overhanging the sides of the said center hull and bottoms shaping into the lower surfaces of the said side sponsons.

2. In an aeroship or similar craft, a center hull, an outer hull on each side of the said center hull, spanners connecting the said outer hulls to the said center hull forward and aft, a cross bridge carried by the said center hull extending over the said outer hulls, links connecting the said outer hulls to the said cross bridge, and an aerofoil truss carrying lifting planes revolvably mounted on the said cross bridge.

3. In an aeroship or similar craft, a center hull, an outer hull on each side of the said center hull, spanners connecting the said outer hulls to the said center hull forward and aft, a cross bridge carried by the said center hull, links connecting the said outer hulls to the said cross bridge, an aerofoil truss revolvably mounted on the said cross bridge, lifting planes carried by the said aerofoil truss, tractor propeller units mounted below the lifting surfaces of the said lifting planes at leading edge and pusher propeller units mounted above the lifting surfaces of the said lifting planes at trailing edge.

4. In an aeroship or similar craft, a center hull, an outer hull on each side of the said center hull, spanners connecting the said outer hulls to the said center hull forward and aft, a cross bridge carried by the said center hull, links connecting the said outer hulls to the said cross bridge, an aerofoil truss revolvably mounted on the said cross bridge, a ring housing carried by the said cross bridge, the said mounting consisting of a bearing ring built into the said aerofoil truss and having a frictionless bearing in the said ring housing, and an electric motor drive for rotation of the said aerofoil truss synchronized to distribute the power effort along the length of the said aerofoil truss.

5. In an aeroship or similar craft, a center hull, an outer hull on each side of the said center hull, spanners connecting the said outer hulls to the said center hull forward and aft, a cross bridge carried by the said center hull, links connecting the said outer hulls to the said cross bridge, a lifting aerofoil mounted on the said cross bridge and propulsion and steering units mounted on the bow and on the stern of the said center hull and on the bows of the said outer hulls, the said propulsion and steering unit consisting of an air resisting propulsion unit swiveled upon a vertical axis and mounted upon a turntable having an electric motor drive.

6. In an aeroship or similar craft, a center hull, an outer hull on each side of the said center hull, spanners connecting the said outer hulls to the said center hull forward and aft, a cross bridge carried by the said center hull, links connecting the said outer hulls to the said cross bridge, a lifting aerofoil revolvably mounted on the said cross bridge forward of amidships and gondola constructions for the bows of the said center hull and the said outer hulls, the said construction raising the bow point of keel line of hull higher above mean water level of hull than the highest wave encountered.

7. In an aeroship or similar craft, a center hull, an outer hull on each side of the said center hull, spanners connecting the said outer hulls to the said center hull forward and aft, a cross bridge carried by the said center hull, links connecting the said outer hulls to the said cross bridge, a propeller turret at the bow and at the stern of the said center hull, the said center hull proper having a comparatively narrow width and great length and having a curved construction at bow and at stern to suit the turntable mountings of the said fore and aft propeller turrets, and wide sponsons springing from the said bow curvature and extending the full length of the said hull proper and around the said curved construction of the stern, the said sponsons having numerous partitions constituting a honeycomb construction of water tight cells to effect a lifting capacity greater than the total weight of the said center hull.

8. In an aeroship or similar craft, a center hull, an outer hull on each side of the said center hull, spanners connecting the said outer hulls to the said center hull forward and aft, a cross bridge carried by the said center hull extending over the said outer hulls, stabilizing air cylinders universally mounted on the said cross bridge in medial vertical plane of the said outer hulls, piston and piston rod for the said air cylinder, universal mounting for the connection of the said piston rod to the said outer hull in medial plane of hull below the mean water line, and means for varying the fluid pressure in the said cylinders to stabilize the said cross bridge against tilting and thereby the said center hull against rolling.

9. In an aeroship or similar craft, a center hull, an outer hull on each side of the said center hull, spanners connecting each of the said outer hulls to the said center hull forward and aft, a stabilizing air cylinder universally mounted in medial vertical plane of the said spanner on each side of the longitudinal medial vertical plane of the said outer hull, piston and piston rod carried by the said cylinder, universal connection of the said piston rod to the said outer hull and means for varying the fluid pressure within the said cylinders to stabilize the said outer hull against rolling.

10. In an aeroship or similar craft, a center hull, an outer hull on each side of the said center hull, spanners connecting each of the said outer hulls to the said center hull forward and aft, a cross bridge carried by the said center hull, links connecting the said outer hulls to the said cross bridge, stabilizing cylinders carried by the said cross bridge over the said outer hulls, piston and piston rod for the said cylinder, a propeller turret, turntable mounting of the said turret on the bow of the said outer hull, a light enclosure mounted on the stern of the said outer hull, the said outer hull consisting of a comparatively long narrow hull proper having a curved construction at bow to suit the turntable mounting of the said turret and curved construction at the stern to suit the form of the said light enclosure, sponsons springing from the said forward curved construction at the bow extending the full length of and around the stern of the said outer hull proper and cross partitions in the said outer hull proper constituting pits for the universal mountings below water line for connections of the said spanners and the said center hull stabilizing cylinder piston rod to the said outer hull.

11. In an aeroship or similar craft, a center hull, an outer hull on each side of the said center hull, spanners connecting each of the said outer hulls to the said center hull forward and aft, a cross bridge carried by the said center hull extending over the said outer hulls, a pit in the said outer hull under the said bridge, a stabilizing air cylinder universally mounted on the said cross bridge, a piston and piston rod for the said air cylinder, a universal mounting of the connection of the said piston rod to the said outer hull within the said pit on medial plane of hull below the water line, and means of closure of the said pit, the said means consisting of a segmental spherical shell secured to the said piston rod covering and engaging an annular spherical shell over the said pit, the radius of the two said spherical shells springing from the center of the said universal mounting of the connection of the piston rod to the outer hull.

12. In an aeroship or similar craft, a center hull, an outer hull on each side of the said center hull, spanners connecting each of the said outer hulls to the said center hull forward and aft, a cross bridge carried by the said center hull extending over the said outer hulls, a pit in the said outer hull under the said bridge, a stabilizing air cylinder universally mounted on the said cross bridge, a piston and piston rod for the said air cylinder, a universal mounting of the connection of the said piston rod to the said outer hull within the said pit on medial plane of hull below the water line, means of closure of the said pit, the said means consisting of a segmental spherical shell secured to the said piston rod covering and engaging an annular spherical shell over the said pit secured to the deck of the said outer hull, and means of water closure of the said pit, the said means consisting of an annular elastic waterproof sheeting secured to the said segmental spherical shell and to the said annular spherical shell.

13. In an aeroship or similar craft, a center hull, an outer hull on each side of the said center hull, spanners connecting each of the said outer hulls to the said center hull forward and aft, the said spanner having a vertical leg extending downwardly into the said outer hull, opening in the deck of the said outer hull around the said spanner leg, transverse partitions forward and aft of the said opening constituting a pit, universal mounting of the said spanner leg within the said pit in medial plane of hull below the water line, and means of closure of the said pit, the said means consisting of a segmental spherical shell secured to the said spanner leg covering and engaging an annular spherical shell over the said pit secured to the deck of the said outer hull.

14. In an aeroship or similar craft, a center hull, an outer hull on each side of the said center hull, spanners connecting each of the said outer hulls to the said center hull forward and aft, the said spanner having a vertical leg extending downwardly into the said outer hull, opening in the deck of the said outer hull for the said spanner leg, transverse partitions forward and aft of the said opening constituting a pit, universal mounting of the said spanner leg within the said pit in medial plane of hull below the water line, a segmental spherical shell secured to the said spanner leg covering and engaging an annular spherical shell secured to the deck of the said outer hull, and means of water closure of the said pit, the said means consisting of an annular elastic waterproof sheeting secured to the said segmental spherical shell and to the said annular spherical shell.

15. In an aeroship or similar craft, a center hull, an outer hull on each side of the said center hull, spanners connecting the said outer hulls to the said center hull forward and aft, a cross bridge carried by the said center hull, an aerofoil truss supported by the said cross bridge, center, intermediate and outer housings carried by the said cross bridge, center, intermediate and outer bearing rings carried by the said aerofoil truss to engage the said housings, means for centering the said aerofoil truss at the center housing, the said means consisting of thrust bearings between the said center truss ring and the said center housing, and means for sliding contact of the said intermediate and outer truss rings in the said intermediate and outer housings.

16. In an aeroship or similar craft, a center hull, an outer hull on each side of the said center hull, spanners connecting the said outer hulls to the said center hull forward and aft, a cross bridge carried by the said center hull, an aerofoil truss carried by the said cross bridge, air propulsion units carried by the said aerofoil truss, air propeller steering units carried at the bow and at the stern of the said center hull, air propeller steering units carried at the bows of the said outer hulls, the said steering unit consisting of an air resisting propulsion unit swiveled upon a vertical axis and mounted on a turntable having an electric motor drive, steering means for rotating the three forward turrets in the same direction, steering means for rotating the aft turret in opposite direction to the said rotation of the said forward turrets, and means for changing direction of rotation of the said turrets, independently or in groups.

17. In an aeroship or similar craft, a center hull, an outer hull on each side of the said center hull, spanners connecting the said outer hulls to the said center hull forward and aft, a cross bridge carried by the said center hull, an aerofoil truss revolvably mounted on the said cross bridge, the said mounting consisting of center, intermediate and other housings carried by the said cross bridge, center, intermediate and outer rings carried by the said arefoil truss having bearings in the said center, intermediate and outer housing, and drive for rotation of the said areofoil truss within the said housings, the said drive consisting of electric motors, shafting, couplings, miter gears, worm and worm wheel, the said shafting having bearings adjacent the said worm, and rings mounted on both sides of the said worm wheel, the said worm shaft bearings being secured to the said worm shaft bearing rings.

18. In an aeroship or similar craft, a center hull, an outer hull on each side of the said center hull, spanners connecting the said outer hulls to the said center hull forward and aft, a cross bridge carried by the said center hull, a pilot house carried by the said center hull, an aerofoil truss carried by the said cross bridge, air propulsion units carried by the said aerofoil truss, the said air propulsion unit consisting of an air propeller and combustion engine drive, electric motors for starting the said combustion engines, air propeller steering turrets mounted at bow and at stern of the said center hull, air propeller steering turrets mounted at the bows of the said outer hulls, electric motor drives for turning the said turrets, and means for control of all of the said electric motors from the said pilot house, the said means consisting of helm operation of controllers for the said steering turret motors and switchboard operation of the said starting motors for the said combustion engines.

19. In an aeroship or similar craft, a center hull, an outer hull on each side of the said center hull, spanners connecting the said outer hulls to the said center hull forward and aft, a cross bridge carried by the said center hull extending over the said outer hulls, links connecting the said outer hulls to the said cross bridge, a cabin built integral with the said center hull and the said cross bridge, the said cabin construction including cabin side portions overhanging the sides of the said center hull, and safety float chambers under the floor of the said overhanging side portions of the said cabin.

20. In an aeroship or similar craft, a center hull, an outer hull on each side of the said center hull, spanners connecting the said outer hulls to the said center hull forward and aft, a turntable for horizontal motion mounted on the deck of the said center hull and a pivot joint carried by the said turntable for connection of the said spanner to the said turntable for vertical motion of the said spanner.

21. In an aeroship or similar craft, a center hull, an outer hull on each side of the said center hull, spanners connecting the said outer hulls to the said center hull forward and aft, a cross bridge carried by the said center hull extending above the said outer hulls, link connecting the said outer hull to the said bridge in medial vertical plane of said outer hull, a universal joint connecting the said link to the said bridge and a universal joint connecting the said link and the said outer hull.

Signed at Elyria, in the county of Lorain and State of Ohio, this 19th day of November, 1932.

SAMUEL E. HITT.